(12) United States Patent
Müller et al.

(10) Patent No.: US 6,182,899 B1
(45) Date of Patent: Feb. 6, 2001

(54) LOADING MECHANISM FOR LOADING AND/OR UNLOADING AT LEAST ONE MEMORY CARD INTO/FROM AN ELECTRONIC APPARATUS

(75) Inventors: Stefan Müller, Wetzlar; Horst Rumpf, Herborn, both of (DE)

(73) Assignee: U.S. Philips Corporation, New York, NY (US)

( * ) Notice: Under 35 U.S.C. 154(b), the term of this patent shall be extended for 0 days.

(21) Appl. No.: 09/141,640

(22) Filed: Aug. 27, 1998

(30) Foreign Application Priority Data

Sep. 2, 1997 (DE) .............................................. 197 38 227

(51) Int. Cl.[7] .................................................. G06K 13/00
(52) U.S. Cl. ........................ 235/475; 235/476; 235/483; 360/99.06
(58) Field of Search .................................... 235/475, 476, 235/479, 492, 483, 480, 481; 360/99.06, 99.07

(56) References Cited

U.S. PATENT DOCUMENTS

| | | | |
|---|---|---|---|
| 4,110,803 | * | 8/1978 | Townsend ............................ 235/449 |
| 4,575,703 | * | 3/1986 | Shishido ............................... 235/479 |
| 4,833,310 | * | 5/1989 | Shimarura et al. .................... 235/492 |
| 4,839,509 | * | 6/1989 | Yasuma et al. ....................... 235/482 |
| 4,933,537 | * | 6/1990 | Takahashi et al. .................... 235/454 |
| 4,935,916 | * | 6/1990 | Suzuki et al. ........................ 369/215 |
| 4,994,658 | * | 2/1991 | Takahashi ............................ 235/473 |
| 5,150,352 | * | 9/1992 | Kurihara .............................. 369/258 |
| 5,434,404 | * | 7/1995 | Liu et al. .............................. 235/475 |
| 5,514,856 | * | 5/1996 | Kitahara et al. ...................... 235/440 |
| 5,648,651 | * | 7/1997 | Inoue ................................... 235/475 |

FOREIGN PATENT DOCUMENTS 05046816 2/1993 (JP) ............................. G06K/13/06

* cited by examiner

Primary Examiner—Thien M. Le
Assistant Examiner—Diane I. Lee
(74) Attorney, Agent, or Firm—Edward W. Goodman

(57) ABSTRACT

A drive unit (7) of an electronic apparatus drives a first transport mechanism (4) for transporting a memory card (1) between an eject position and an intermediate position, and a second transport mechanism (5) for transporting the memory card (1) between an intermediate position and a play position. The second transport mechanism (5) is coupled to the drive unit (7) by a lead screw transmission (9,14).

6 Claims, 5 Drawing Sheets

LOADING MECHANISM FOR LOADING AND/OR UNLOADING AT LEAST ONE MEMORY CARD INTO/FROM AN ELECTRONIC APPARATUS

BACKGROUND OF THE INVENTION

1. Field of the Invention

The invention relates to a loading mechanism for loading and/or unloading at least one memory card into/from an electronic apparatus, comprising a first transport mechanism for the transport of the memory card between an eject position and an intermediate position, a second transport mechanism for the transport of the memory card between the intermediate position and a play position, and a drive unit for driving the two transport mechanisms.

2. Description of the Related Art

Such a loading mechanism is known from Japanese Patent Application JP 05046816. This known loading mechanism comprises two rollers as the first transport mechanism, these rollers being mounted on a drive shaft and conveying the memory card non-positively from the eject position into the intermediate position by exerting pressure on the surface of said card. The eject position is defined as the position in which the memory card can be removed by hand from the electronic apparatus by a user. The intermediate position is situated a short distance in front of before a connector element of the electronic apparatus, this connector element being adapted to contact a connector element of the memory card. The position in which the connector element of the memory card is in contact with the connector element of the electronic apparatus and in which, as a result of this, information stored on the memory card can be read out by the electronic apparatus or information can be written into the memory card by the electronic apparatus, is referred to as the play position.

In this known construction, the drive unit is an electric motor, which drives the drive shaft via a first transmission. The first transport mechanism conveys the memory card with a comparatively high speed and a comparatively small traction force. The second transport mechanism is a pivotal lever having teeth which can mesh with a reduction gear. The reduction gear is constructed as a toothed-wheel transmission. By means of two guide pins, the pivotal lever urges the connector element of the memory card into the connector element of the electronic apparatus with a substantial force. The guide pins are actuated by means of a solenoid.

Such a construction requires a substantial mounting space and large number of parts.

SUMMARY OF THE INVENTION

It is an object of the invention to provide a loading mechanism which can be realized with a smaller number a smaller mounting volume.

For the transport of the memory card between the intermediate position and the play position, the second transport mechanism can be coupled to the drive unit by means of a lead screw transmission.

A lead screw transmission is to be understood to mean a transmission comprising a combination of a lead screw and a lead screw nut which engages with the screwthread of the lead screw. Thus, a lead screw transmission converts a rotary movement into a translatory movement or, conversely, a translatory movement into a rotary movement. Such a lead screw transmission enables a substantial reduction to be achieved within a small mounting volume.

For the transport of the memory card between the eject position and the intermediate position, the drive unit drives the first transport mechanism directly or via a transmission. Preferably, this is effected with a comparatively high speed and a comparatively small traction force. However, starting from the intermediate position, a large traction force is needed to urge the memory card into the connector element of the electronic apparatus, and to ensure a satisfactory contact. For this purpose, the second transport mechanism has been provided, which is driven by the drive unit via the lead screw transmission. The lead screw transmission provides the reduction necessary to urge the memory card with a large force into the connector element of the electronic apparatus.

Such a construction enables bulky toothed-wheel transmissions to be dispensed with, which reduces the mounting volume of the loading mechanism.

The drive shaft preferably extends above or underneath the loading plane of the memory card. The drive shaft carries one or more drive rollers, which are preferably made of rubber. During the transport of the memory card between the eject position and the intermediate position, the drive rollers are coupled, for example, non-positively or positively to the drive shaft, as a result of which, they rotate with the drive shaft. The drive rollers then preferably exert pressure on the upper or lower surface of the memory card and the memory card is moved from the eject position into the intermediate position by means of the drive rollers as a result of the friction.

In an advantageous embodiment of the invention, the lead screw transmission is arranged on the drive shaft. As a result of this, the drive shaft, which is present anyway, is utilized for the lead screw transmission, so that additional mounting space and parts are saved. Preferably, the relevant transport mechanism is driven by means of the coupling mechanism, which can be constructed, for example, as a coupling lever. In the area of the intermediate position, the coupling mechanism disengages the drive rollers during loading of the memory card, i.e., the rollers are no longer non-positively or positively coupled to the drive shaft and, as a result, no force is transmitted from the drive shaft to the drive roller. At the same time, the coupling nut, which is mounted so as to be axially movable on the drive shaft, engages with the screwthread, as a result of which the lead screw transmission is formed and the driving force is transmitted from the drive unit to the second transport mechanism via this lead screw transmission. Likewise, when the memory card is unloaded, the coupling nut is disengaged from the screwthread in the area of the intermediate position and, at the same time, the drive rollers are non-positively or positively coupled to the eject position drive shaft, as a result of which, the first transport mechanism, starting from the intermediate position, takes over the transport function from the second transport mechanism during unloading of the memory card.

Since the drive rollers and the screwthread are arranged adjacent one another on the same drive shaft, the coupling mechanism can be realized in a simple and compact manner, and the coupling mechanism can be utilized for driving both the first and the second transport mechanism.

In an advantageous embodiment the transport slide is positively coupled to the memory card during the transport of the memory card from the intermediate position into the play position. Such a positive coupling also enables substantial forces to be transmitted without the occurrence of slippage between the transport slide and the memory card. In this embodiment, the linear movement of the coupling nut of the lead screw transmission is converted into a linear movement of the transport slide by means of the coupling lever.

Preferably, the transport slide has a rear stop edge and a front stop edge. During the transport of the memory card from the intermediate position into the play position, the rear stop edge acts upon the rear edge of the memory card and urges the memory card into the connector element of the electronic apparatus. During unloading of the memory card, the front stop edge acts upon the front edge of the memory card and urges the memory card out of the connector element of the electronic apparatus. This ensures that both during loading and unloading, a positive coupling between the memory card and the transport slide is obtained, as a result of which, a slip-free transport of the memory card between the play position and the intermediate position is guaranteed both during loading and unloading.

In comparison with a one-part construction of the transport slide, two-part construction of the transport slide has the advantage that less mounting volume and, particularly, less mounting height is needed because only a part of the transport slide, instead of the whole transport slide, is to be pivoted. The rear part of the transport slide, which part is to be pivoted, is preferably shorter than the front part of the transport slide. This minimizes the forces required for the pivotal movement.

During loading of the memory card, the rear part with the rear stop edge is first pivoted downwards away from the memory card, so that the memory card can be introduced into the electronic apparatus by means of the first transport mechanism without being obstructed by the rear stop edge. Briefly, before the intermediate position is reached the rear part with the rear stop edge is then pivoted upwards towards the memory card, so that the rear stop edge of the rear part engages behind the rear edge of the memory card and acts upon the rear edge of the memory card starting from the intermediate position, as a result of which, the memory card is urged into the connector element of the electronic apparatus. Conversely, when the memory card is unloaded the rear part of the transport slide with the rear stop edge is pivoted downwards after the intermediate position has been reached, so that, subsequently, the memory card can be moved into the eject position by means of the first transport mechanism.

Preferably the drive roller is rotatably mounted on the drive shaft. This makes it possible that, during the transport of the memory card between the intermediate position and the play position, the drive roller does not exert any driving force on the memory card. The drive roller now rather freewheels and is rotated only slowly in accordance with the speed of movement of the transport slide and the memory card as a result of the friction between the drive roller and the memory card. Thus, it is avoided that the drive roller is rotated with the comparatively high speed of the drive shaft during the transport of the memory card between the intermediate position and the play position, which could give rise to slippage, and consequent abrasion, between the memory card and the drive roller. The driving force of the drive roller is transmitted to the drive roller by means of a friction or claw coupling only between the eject position and the intermediate position.

DETAILED DESCRIPTION OF THE PREFERRED EMBODIMENTS

Figure 1:
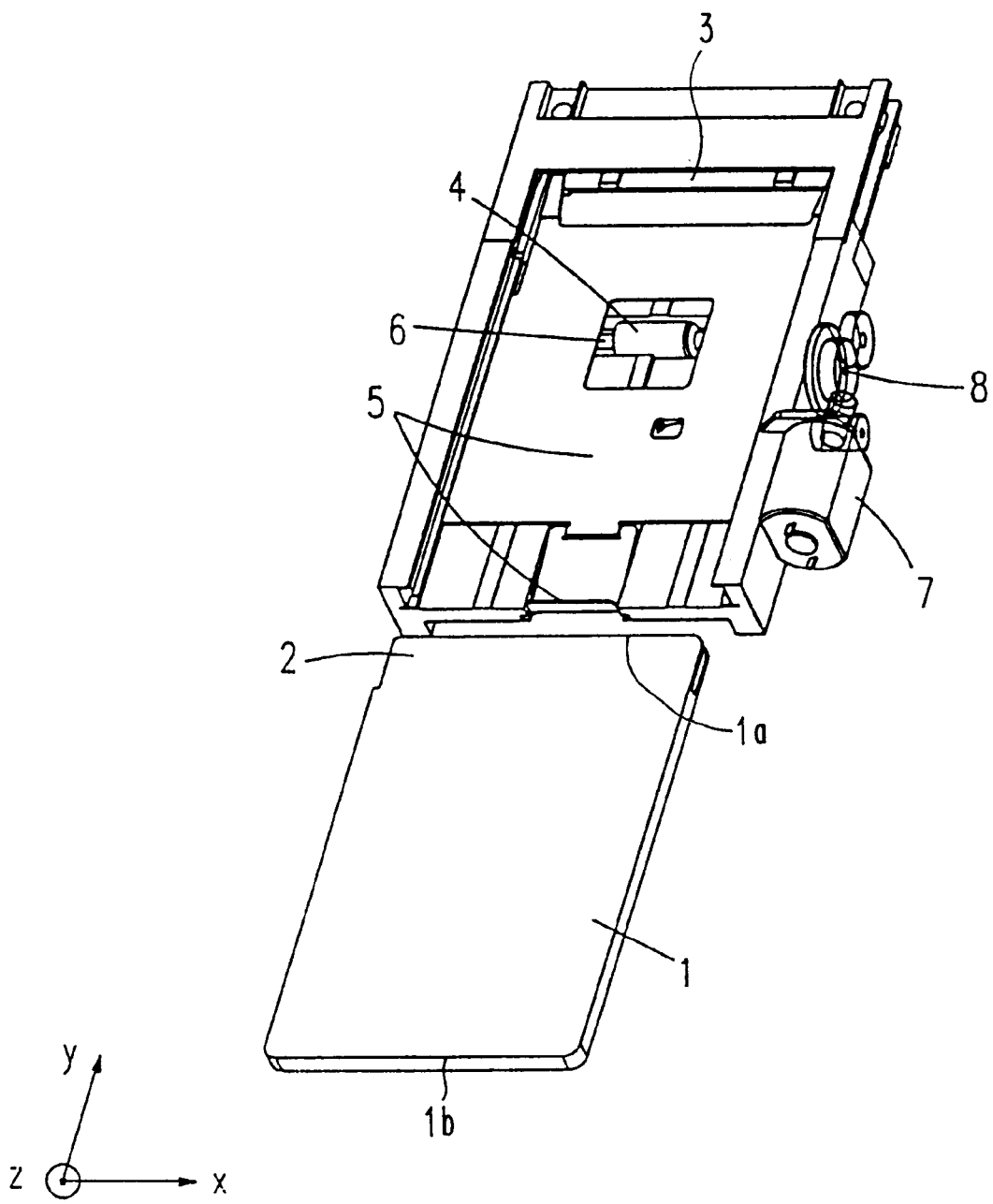
FIG. 1 is a perspective view of a loading mechanism for loading or unloading a memory card into/from an electronic apparatus, the electronic apparatus including a connector element for making contact with the memory card, and a drive roller being provided as the first transport mechanism, and a transport slide being provided as the second transport mechanism.

FIG. 1 shows a loading mechanism of an electronic apparatus for a memory card 1. Such a memory card can be, for example, a memory card in accordance with the PCMCIA standard. The memory card 1 has a connector element 2 having a plurality of connector contacts, not shown, a front edge 1a and a rear edge 1b. For making contact with the memory card 1, the electronic apparatus, which is not shown, includes a connector element 3, which can mate with the connector element 2 of the memory card 1.

For loading and unloading the memory card 1, the transport mechanism comprises a drive roller 4 as the first transport mechanism and a transport slide 5 as the second transport mechanism. The drive roller 4 is mounted on a drive shaft 6 which can be driven so as be to rotated in two directions by means of a motor 7 via a transmission 8.

The memory card 1 is loaded in a loading direction y. The drive shaft 6 extends in an x direction perpendicular to this loading direction y. The loading direction y and the x direction define a loading plane x-y. A z direction is defined as a direction perpendicular to this loading plane x-y.

Figure 2:
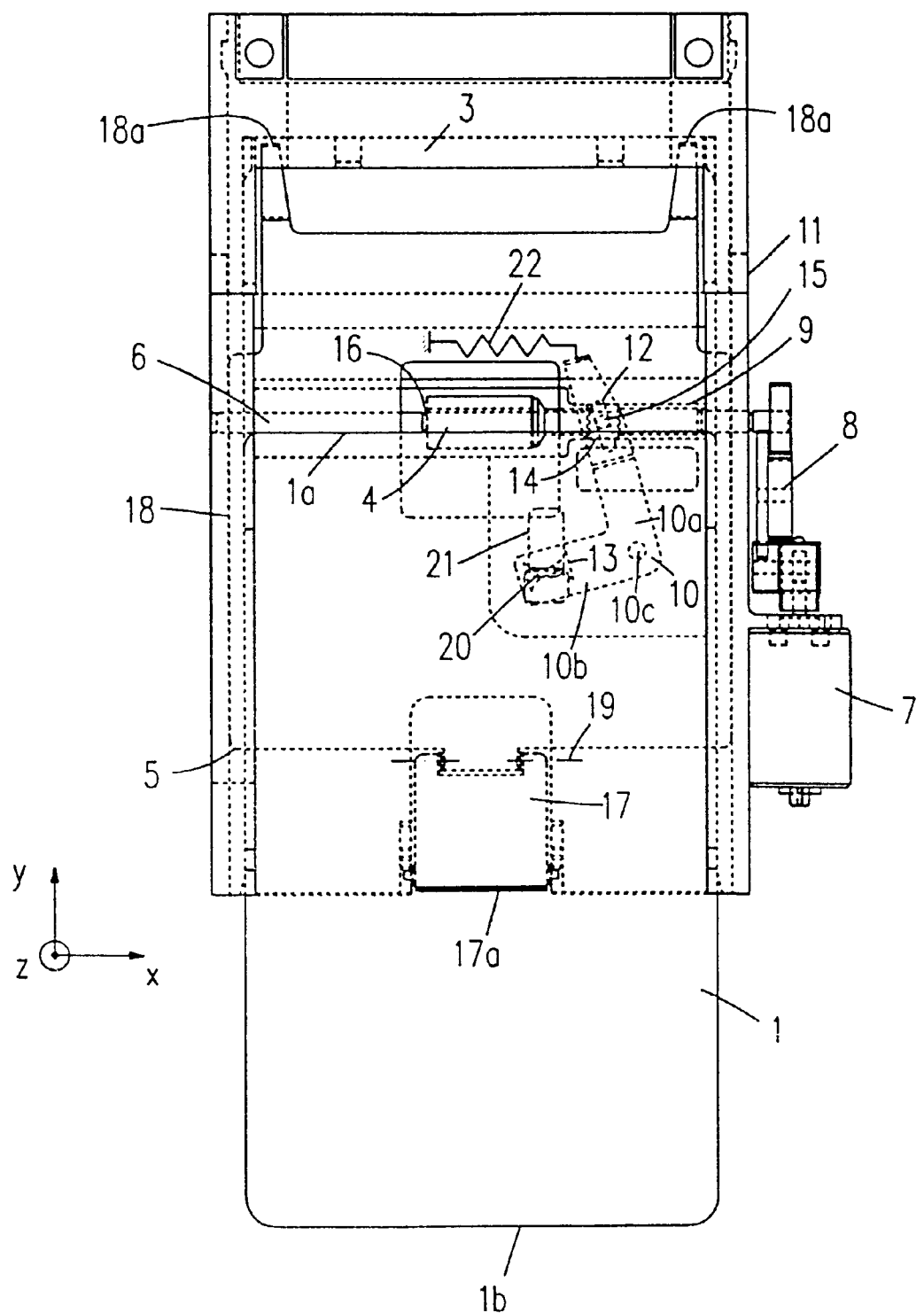
FIG. 2 is a plan view of the loading mechanism with the memory card in an eject position, in which the memory card can be removed by hand by a user.

FIG. 2 is a plan view of the loading mechanism in a situation in which the memory card 1 is in an eject position, in which the memory card 1 can be removed by hand by a user, or in which the memory card to be loaded can be inserted by hand by the user. The drive roller 4 is concentric with the drive shaft 6 and, between the drive roller 4 and the drive shaft 6, a clearance exists, as a result of which, the drive roller 4 is rotatable relative to the drive shaft 6. Adjacent the drive roller 4, the drive shaft 6 has a screwthread 9 having a small pitch, for example, so as to obtain a reduction ratio by a factor of 10 for the linear movement of the card. A coupling lever 10 is mounted so as to be pivotable about a pivot 10c on a chassis plate 11 of the loading mechanism. The coupling lever 10 is L-shaped and has a first arm 10a and a second arm 10b. The first arm 10a of the coupling lever 10 has a longitudinal slot 12 and the second arm 10b of the coupling lever 10 has a guide slot 13.

A coupling nut 14 having internal screwthread is mounted on the drive shaft 6 so as to be axially movable. The coupling nut 14 comprises a round coupling pin 15 which engages in the longitudinal slot 12 of the coupling lever 10. When the coupling lever 10 is pivoted, the coupling nut 14 can be moved in the direction of the longitudinal axis of the drive shaft 6, the coupling nut 14 being guided by the coupling pin 15 in the longitudinal slot 12 of the coupling lever 10. When the coupling lever 10 is pivoted clockwise, the coupling nut 14 is brought into engagement with the screwthread 9, so as to form a lead screw transmission. This lead screw transmission has a large reduction ratio corresponding to the pitch of the screwthread 9. When the coupling lever 10 is pivoted counter-clockwise, the coupling nut 14 is urged against the drive roller 4. As a result of this, the drive roller 4 is urged against a stop edge 16 of the drive shaft 6, which results in a frictional coupling between the stop edge 16 and the drive roller 4 and between the drive roller 4 and the coupling nut 14.

The transport slide 5 has two parts and comprises a rear part 17 and a front part 18. The rear part 17 is mounted to the front part so as to be rotatable about an axis of rotation 19. The rear part 17 has a rear stop edge 17a and the front part 18 has two front stop edges 18a.

The transport slide 5 has a raised guide portion 20 which extends in the x-z plane and which has one side guided in the guide slot 13 of the coupling lever and another side guided in a longitudinal slot which extends in the y direction in the chassis plate 11. The front part 18 is guided in the loading plane x-y by guide means (not shown). The rear part 17, as already described, is mounted to the front part 18 so as to be rotatable about the axis of rotation 19. The angle of rotation with respect to the loading plane x-y is controlled by a guide element which is not visible in FIG. 2.

The coupling lever 10 is urged in a counter-clockwise direction by a spring 22, which is shown diagrammatically.

In the eject position shown in FIG. 2, the coupling lever 10 is urged towards the drive roller 4 by the spring 22. As a result of this, the coupling nut 14, which is guided in the longitudinal slot 12 of the coupling lever 10, is also urged against the drive roller 4, which causes the drive roller 4 to be urged against the stop edge 16, as a result of which, the drive roller 4 and the drive shaft 6 are frictionally coupled. In order to load the memory card 1, the motor 7 is turned on and the drive shaft 6 as well as the drive roller 4, which is frictionally coupled to the drive shaft 6, are set into rotation. The drive roller 4 then exerts pressure on the surface of the memory card 1, which gives rise to friction, causing the memory card 1, to be moved non-positively in the loading direction y by the drive roller 4. The transport speed is then, for example, in a range of approximately 30 mm/s and the force exerted on the memory card 1 by the drive roller 4 is, for example, in the range of approximately 3 N.

The memory card 1, thus driven by the drive roller 4, is moved so far into the apparatus until the front edge 1a of the memory card 1 reaches the front stop edges 18a of the transport slide 5. Subsequently, the transport slide 5 is moved in the y direction by the memory card 1 and the guide portion 20 of the transport slide 5 is urged against the guide slot 13 of the coupling lever 10, as a result of which, the coupling lever 10 is pivoted counter-clockwise against the spring force exerted by the spring 22. As a result, the coupling nut 14 is moved away from the drive roller 4 and the frictional coupling between the drive roller 4 and the drive shaft 6 is cancelled. Approximately at the same time, the coupling nut 14 engages with the screwthread 9 of the drive shaft 6, as a result of which, the lead screw transmission is activated.

Figure 3:
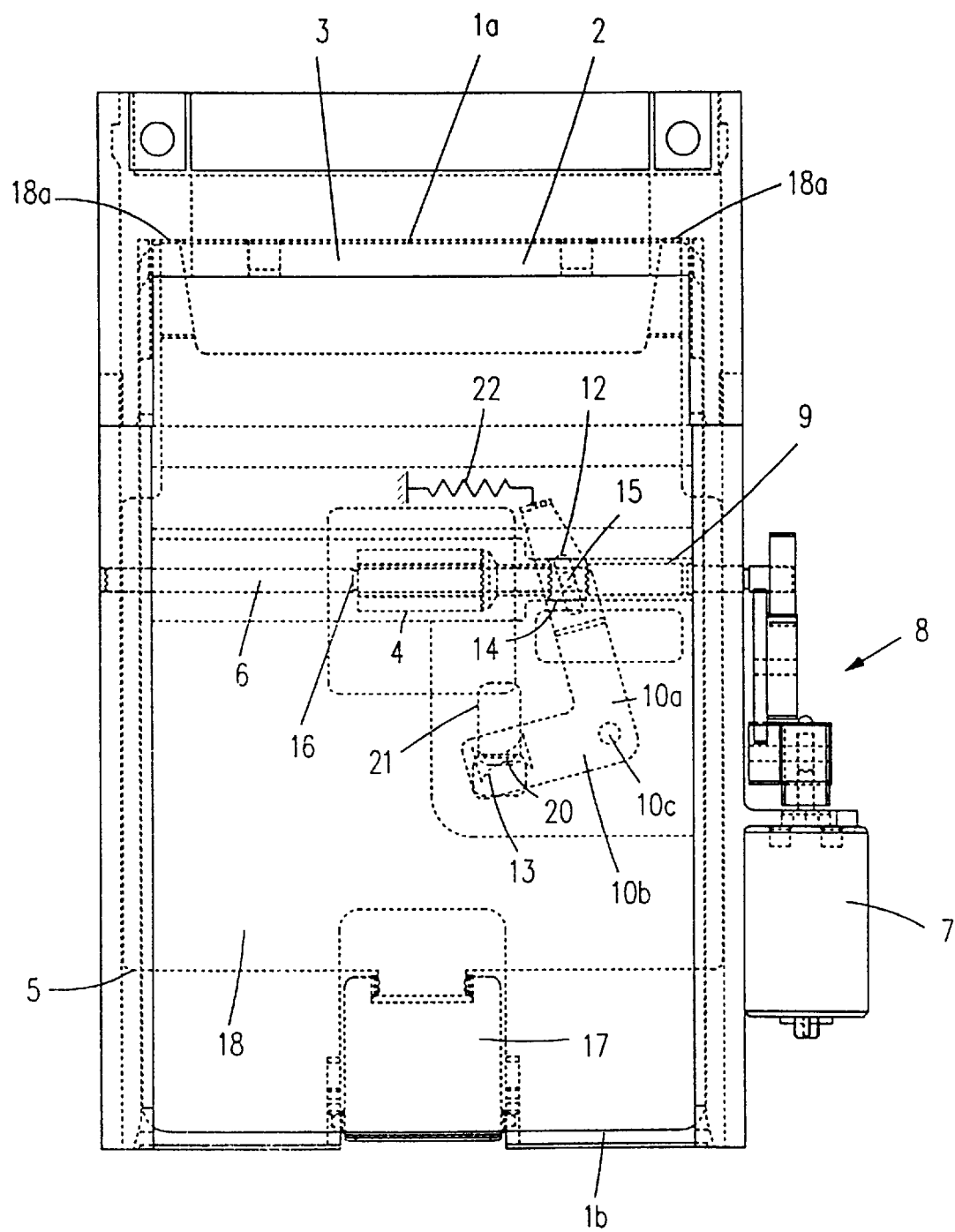
FIG. 3 is another plan view of the loading mechanism, in a situation in which the memory card has been moved to a short distance from the connector element of the electronic apparatus by the first transport mechanism and in which the drive roller of the first transport mechanism has been disengaged and a lead screw transmission has just been coupled in order to drive the transport slide.

FIG. 3 is a plan view which shows the position in which the coupling nut 14 has just come into engagement with the screwthread 9 of the drive shaft 6. As soon as the coupling nut 14 has engaged with screwthread 9 of the drive shaft 6, the coupling lever 10 takes over the subsequent transport of the transport slide 5 in that the coupling lever 10 is rotated clock-wise by means of the coupling nut 14 and, as a consequence of this, the guide slot 13 of the coupling lever 10 is urged against the guide edge 20 of the transport slide 5. Due to the large reduction ratio of the lead screw transmission formed by the screwthread 9 and the coupling nut 14, the coupling lever 10 urges the transport slide 5 towards the connector element 3 of the electronic apparatus with a substantial force of, for example, 30 N. For the transport of the memory card 1, the rear part 17 of the transport slide 5 is pivoted towards the memory card 1, as a result of which, the rear stop edge 17a engages behind the rear edge 1b of the memory card. Subsequently, the rear stop edge 17a of the transport slide 5 urges the memory card 1 with a substantial force into the play position shown in FIG. 4. The transport slide 5 moves the memory card 1 positively by means of the rear stop edge 17a in such a manner that no slippage can occur between the transport slide 5 and the memory card 1.

Figure 4:
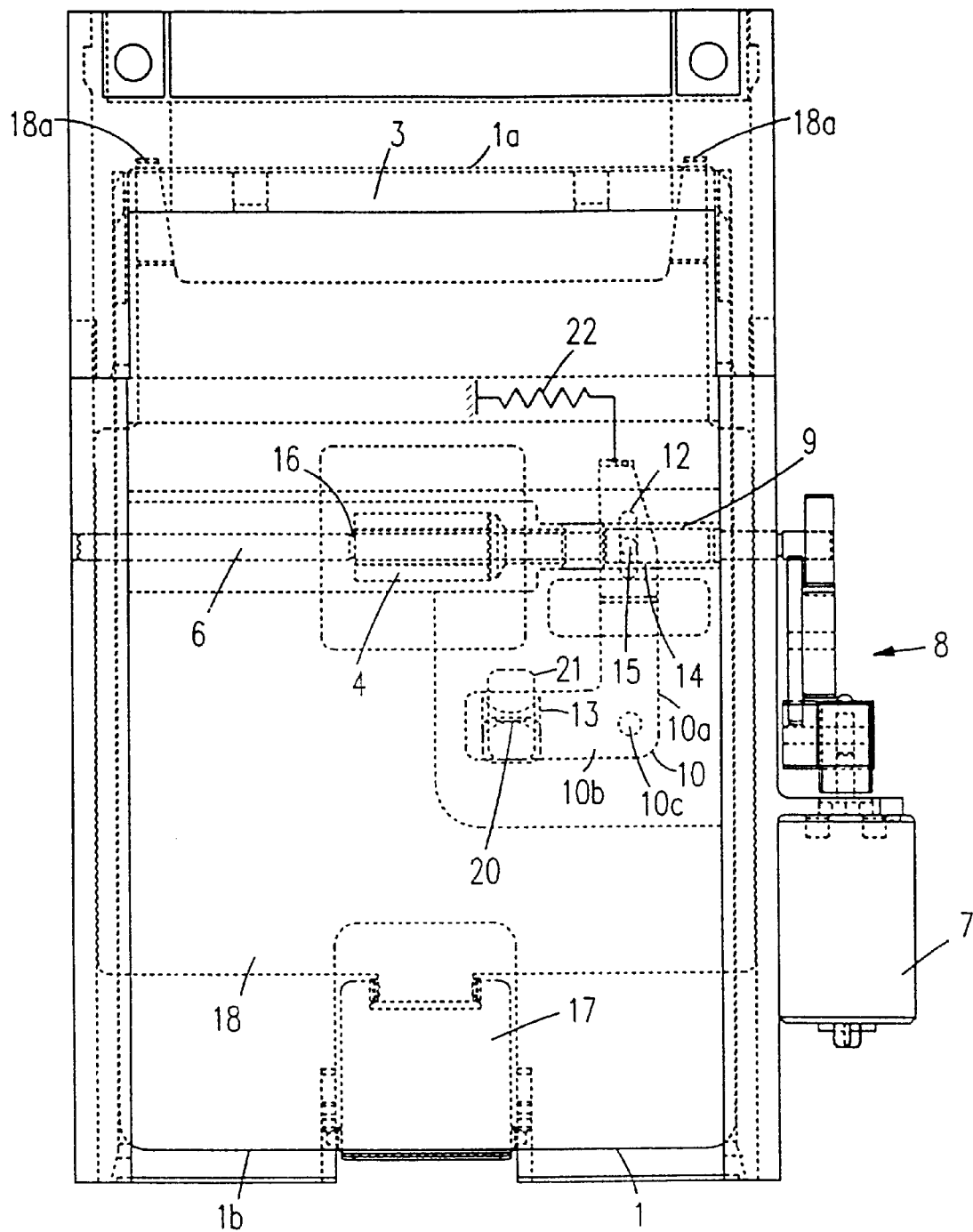
FIG. 4 shows the loading mechanism in a plan view in the play position, in which the connector element of the memory card has engaged the connector element of the electronic apparatus, thereby enabling an exchange of information between the and electronic apparatus the memory card.

In the play position shown in FIG. 4, the connector element 3 of the electronic apparatus and the connector element 2 of the memory card 1 are in contact with one another, as a result of which, information stored in the memory card can be read by means of the electronic apparatus or, conversely, the electronic apparatus can write information into the memory card 1.

The interaction between the first and the second transport mechanism will now be illustrated with reference to FIGS. 5A, 5B, 5C and 5D. FIGS. 5A–5D are side views which each show different positions of the transport slide and the memory card.

Figure 5A:
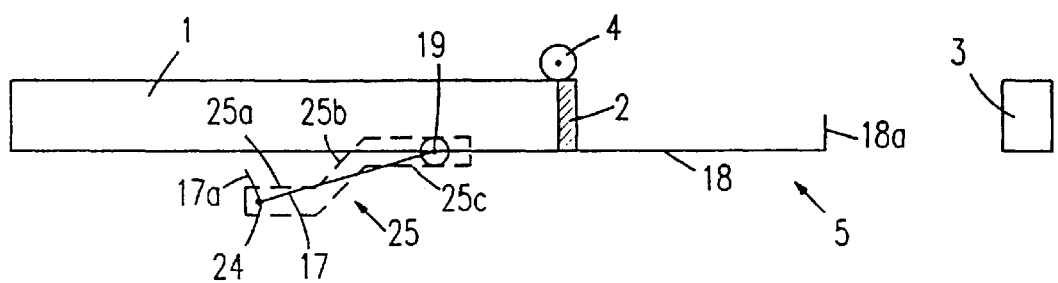
FIG. 5A is a diagrammatic side view showing the transport slide and the memory card in the eject position, in which a rear part of the transport slide has been pivoted downwards underneath the memory card.

FIG. 5A diagrammatically shows the transport slide 5 and the memory card 1 in the eject position. The rear part 17 of the transport slide 5 with the rear stop edge 17a has been pivoted away downwards underneath the memory card 1, so that subsequently, the memory card 1 can be moved into the electronic apparatus in the loading direction y by means of the drive roller 4. The rear part 17 of the transport slide 5 has a guide pin 24, which is guided in a guide member 25. The guide member 25, which is secured to the chassis plate 11 has a first horizontal portion 25a, an inclined portion 25b, and a second horizontal portion 25c. In the eject position shown in FIG. 1, the guide pin 24 is situated at the beginning of the horizontal portion 25a.

Starting from the eject position shown in FIG. 5A, the memory card 1 is moved in the loading direction y by the drive roller 4 until the front edge 1a of the memory card 1 abuts against the front stop edge 18a of the transport slide 5. This initiates the change-over to the second transport mechanism. The memory card 1, initially still driven by the drive roller 4, acts upon the front stop edge 18a of the transport slide 5 and moves this slide in the y direction. As a result of this, as described with reference to FIG. 3, the drive roller 4 is disengaged and the coupling nut 14 engages with the screwthread 9 of the drive shaft 6.

Figure 5B:
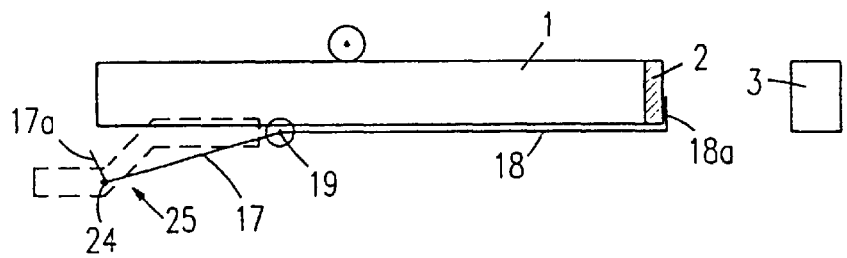
FIG. 5B is a side view similar to FIG. 5a but in which the memory card has reached a front stop edge of the transport slide.

In the situation shown in FIG. 5B, which corresponds to FIG. 3, the guide pin 24 of the rear part 17 of the transport slide 5 is disposed at the end of the first horizontal portion 25a. The transport of the transport slide 5 into this position is effected by means of the memory card 1 driven by the drive roller 4. In the position shown in FIG. 5B the drive roller 4 has just been uncoupled and the coupling nut 14 has just engaged with the screwthread 9 as shown in FIG. 3.

Starting from the position shown in FIG. 5B the transport slide 5 is moved in the loading direction y with a substantial force by means of the coupling lever 10, as a result of which, the guide pin 24 is lifted in the inclined portion 25b of the guide member 25. As a result, the rear stop edge 17a of the rear part 17 engages behind the rear edge 1b of the memory card 1. This position, which is referred to as the intermediate position, is shown in FIG. 5C.

Figure 5C:
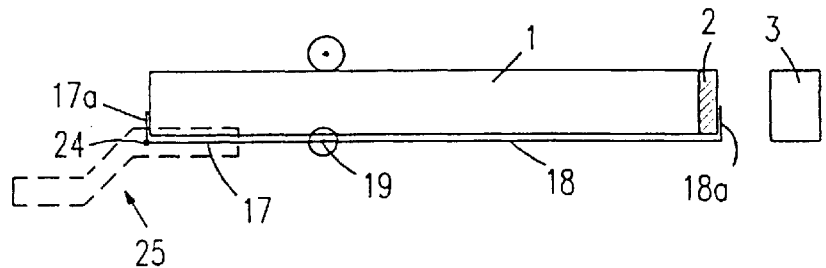
FIG. 5C is a diagrammatic side view similar to FIGS. 5a and 5b but in which the rear part of the transport slide has been pivoted up and the rear stop edge of the transport slide acts upon the rear edge of the memory card.
Figure 5D:
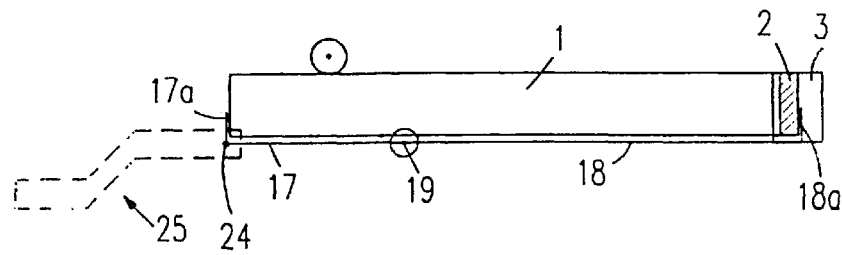
FIG. 5D is a diagrammatic side view similar to FIGS. 5a to 5c, but in which the loading mechanism is in the play position.

In the intermediate position, shown in FIG. 5C, a positive coupling exists between the memory card 1 and the transport slide 5 and the memory card 1 can be urged into the play position shown in FIG. 5d with a substantial force by means of the transport slide 5.

The play position, shown in FIG. 5D corresponds to FIG. 4. In the play position, the guide pin 24 is situated at the end of the second horizontal portion 25c and the connector element 2 of the memory card 1 mates with the connector element 3 of the electronic apparatus.

The memory card 1 is unloaded exactly the other way round, i.e., starting from the play position shown in FIG. 5d the transport slide 5 is moved in a direction opposite to the loading direction y by the coupling lever 10, as a result of which, the front stop edge 18a of the transport slide 5 acts upon the front edge 1a of the memory card 1. As a result of this, the memory card 1 first assumes the position shown in FIG. 5C. Subsequently, the rear part 17 of the transport slide 5 is pivoted away in a downward direction, and the coupling nut 14 is disengaged from the screwthread 9 and is urged against the drive roller 4. As a result of this, the drive roller 4 again takes over the transport of the memory card 1 and moves it into the eject position shown in FIG. 5A.

What is claimed is:

1. A loading mechanism for loading and/or unloading at least one memory card into/from an electronic apparatus, said loading mechanism comprising:
    a first transport mechanism for transporting the memory card between an eject position and an intermediate position, said first transport mechanism comprising a drive shaft and at least one drive roller carried on the drive shaft, said at least one drive roller being coupled to the memory card for transporting the memory card between the eject position and the intermediate position;
    a second transport mechanism for transporting the memory card between the intermediate position and a play position;
    a drive unit for driving the first and second transport mechanisms; and
    a lead screw transmission mounted on the drive shaft for coupling the second transport mechanism to the drive unit, said lead screw transmission comprising:
    a screwthread formed in the drive shaft;
    a coupling nut mounted on the drive shaft for axial movement; and
    a coupling mechanism for coupling the drive roller to the drive shaft, or for causing the coupling nut to engage with the screwthread, depending on the position of the memory card.

2. The loading mechanism as claimed in claim 1, the drive roller is rotatably mounted on the drive shaft and is coupleable to the drive shaft by a friction coupling or claw coupling for transporting the memory card between the eject position and the intermediate position.

3. A loading mechanism for loading and/or unloading at least one memory card into/from an electronic apparatus, said loading mechanism comprising:
    a first transport mechanism for transporting the memory card between an eject position and an intermediate position;
    a second transport mechanism for transporting the memory card between the intermediate position and a play position;
    a drive unit for driving the first and second transport mechanisms; and
    a lead screw transmission coupling the second transport mechanism to the drive unit,
wherein the second transport mechanism comprises a transport slide for carrying the memory card, and a coupling lever for coupling the transport slide to the lead screw transmission, the transport slide being movable between the intermediate position and the play position by the drive unit driving the lead screw transmission, and by the lead screw transmission acting on the coupling lever, whereby the transport slide is coupled to the memory card.

4. The loading mechanism as claimed in claim 3, wherein the transport slide has a rear stop edge for engaging the memory card when the memory card is transported from the intermediate position into the play position, and a front stop edge for engaging the memory card when the memory card is transported from the play position into the intermediate position.

5. The loading mechanism as claimed in claim 3, wherein the transport slide comprises a front part and a rear part pivotably mounted to the front part, the rear part comprising the rear stop edge and the front part comprising the front stop edge, and wherein the loading mechanism further comprises a guide member for pivoting the rear part with the rear stop edge towards the memory card when the transport slide moves in the loading direction, and for pivoting the rear part away from the memory card when the transport slide moves in a direction opposite to the loading direction.

6. An electronic apparatus for reading information stored on a memory card and/or for writing information onto a memory card, said electronic apparatus comprising:
    a contact element for making electrical contact with the memory card;
    a loading mechanism for the memory card comprising a first transport mechanism for transporting the memory card between an eject position and an intermediate position, said first transport mechanism comprising a drive shaft and at least one drive roller carried on the drive shaft, said at least one drive roller being coupled to the memory card for transporting the memory card between the eject position and the intermediate position, and a second transport mechanism for transporting the memory card between the intermediate position and a play position;
    a drive unit for driving the first and second transport mechanisms of the loading mechanism; and a lead screw transmission mounted on the drive shaft for coupling the second transport mechanism to the drive unit, said lead screw transmission comprising:

a screwthread formed in the drive shaft;

a coupling nut mounted on the drive shaft for axial movement; and a coupling mechanism for coupling the drive roller to the drive shaft, or for causing the coupling nut to engage with the screwthread, depending on the position of the memory card.

\* \* \* \* \*